United States Patent
Lore

(10) Patent No.: US 8,246,433 B2
(45) Date of Patent: Aug. 21, 2012

(54) TEAM BASED FANTASY SPORT CONTEST

(75) Inventor: Vito Lore, Somerville, MA (US)

(73) Assignee: Alma Mater Sports, LLC, Somerville, MA (US)

( * ) Notice: Subject to any disclaimer, the term of this patent is extended or adjusted under 35 U.S.C. 154(b) by 1354 days.

(21) Appl. No.: 11/845,739

(22) Filed: Aug. 27, 2007

(65) Prior Publication Data
US 2008/0051201 A1 Feb. 28, 2008

Related U.S. Application Data

(60) Provisional application No. 60/840,182, filed on Aug. 25, 2006.

(51) Int. Cl.
*A63F 9/24* (2006.01)
(52) U.S. Cl. .................. 463/9; 463/4; 463/42
(58) Field of Classification Search .............. 463/1, 9, 463/42; 700/91–93
See application file for complete search history.

(56) References Cited

U.S. PATENT DOCUMENTS

| | | | | |
|---|---|---|---|---|
| 4,918,603 A | * | 4/1990 | Hughes et al. ............... | 463/4 |
| 5,018,736 A | | 5/1991 | Pearson et al. | |
| 5,971,854 A | | 10/1999 | Pearson et al. | |
| 6,135,881 A | * | 10/2000 | Abbott et al. ............... | 463/3 |
| 6,371,855 B1 | | 4/2002 | Gavriloff | |
| 6,669,565 B2 | | 12/2003 | Liegey | |
| 6,688,978 B1 | | 2/2004 | Herman | |
| 7,001,279 B1 | | 2/2006 | Barber et al. | |
| 7,699,707 B2 | * | 4/2010 | Bahou ............... | 463/42 |
| 2002/0107073 A1 | | 8/2002 | Binney | |
| 2002/0115488 A1 | | 8/2002 | Berry et al. | |
| 2005/0159220 A1 | | 7/2005 | Wilson et al. | |
| 2006/0040719 A1 | | 2/2006 | Plimi | |
| 2006/0046807 A1 | | 3/2006 | Sanchez | |
| 2006/0064184 A1 | | 3/2006 | Ream et al. | |
| 2006/0105827 A1 | | 5/2006 | Metzger et al. | |

* cited by examiner

*Primary Examiner* — Melba Bumgarner
*Assistant Examiner* — Lawrence Galka
(74) *Attorney, Agent, or Firm* — Cunningham IP Law, LLC; Gavin R. Cunningham

(57) ABSTRACT

A method provides a fantasy sport contest having rules wherein a plurality of participants are permitted to populate respective fantasy rosters with actual athletes for purposes of competing with each other based on corresponding real-life field-of-play performances of the actual athletes. The method includes restricting a population of each of a first and second fantasy roster for respective first and second participants to actual athletes who are teammates on respective first and second real-life team, and measuring corresponding real-life field of play performance of the actual athletes on the first and second fantasy rosters. A ranking is established as between the first participant and the second participant based on the respective performance measurements, and is further displayed. The first real-life team and the second real-life team may be the same real-life team, or different real-life teams.

20 Claims, 11 Drawing Sheets

Defense and Special Teams 700

| Position | Tackles 710 | 10+ Tackles 712 | TFL 714 | Sacks 716 | Int 718 | BrUp 720 722 |
|---|---|---|---|---|---|---|
| DT | 2.0 | 10 | 5 | 20 | 30 | 15 |
| DE, LB, S | 1.5 | 10 | 5 | 10 | 20 | 12 |
| CB | 2.0 | 10 | 5 | 20 | 30 | 15 |
| Other | 2.0 | 10 | 5 | 20 | 30 | 15 |

| Position | FR | FF | Def. TD | Block Kick | Safety | Special Teams TD 702 |
|---|---|---|---|---|---|---|
| DT | 15 | 15 | 30 | 20 | 30 | 30 |
| DE, LB, S | 15 | 15 | 30 | 20 | 30 | 30 |
| CB | 20 | 20 | 30 | 20 | 30 | 30 |
| Other | 20 | 20 | 30 | 20 | 30 | 30 |

Offense

| Position | TD | Rec | 10 Yds Rec | 10 Yds Rush | Fumbles 704 |
|---|---|---|---|---|---|
| WR, RB | 10 | 1.5 | 1.5 | 1.5 | -5 |
| TE | 25 | 2.5 | 2.5 | 1.5 | -5 |
| QB | 10 | 1.5 | 1.5 | 1.5 | -5 |
| Other | 10 | 1.5 | 1.5 | 1.5 | -5 |

| Position | Comp | 10 Yds Pass | TD Pass | Int Thrown | 2 Pt Conv 706 |
|---|---|---|---|---|---|
| WR, RB | 0.2 | 0.6 | 20 | -4 | 2 |
| TE | 0.2 | 0.6 | 20 | -4 | 2 |
| QB | 0.2 | 0.6 | 8 | -4 | 2 |
| Other | 0.2 | 0.6 | 20 | -4 | 2 |

Kicking

| Position | PAT | PAT Miss | FG Made | FG Miss | FG 40-49 Yds | FG 50+ Yds 708 |
|---|---|---|---|---|---|---|
| All | 1 | -1 | 15 | -5 | 5 | 20 |

FIG. 7

Legend

Offense

TD : per Touchdown scored
Rec : per Reception
10 Yds Rec : per 10 Yards Receiving*
10 Yds Rush : per 10 Yards Rushing*
Fumbles : per Fumble lost
Comp : per pass Completion
10 Yds Pass : per 10 Yards Passing*
TD Pass : per Touchdown Pass thrown
Int Thrown : per Interception Thrown
2 Pt Conv : per 2 Pt Conversion

* partial points awarded for each yard
(passing, receiving and rushing)

Defense and Special Teams

Tackles : per Tackle
10+ Tackles : bonus for 10 or more Tackles
TFL : per Tackle for Loss
Sacks : per Sack
Int : per Interception
BrUp : per pass Break Up
FR : per Fumble Recovery
FF : per Forced Fumble
Def. TD : per Defensive Touchdown
Block Kick : per Blocked Kick
Safety : per Safety
Special Teams TD : per Special Teams TD

Kicking

PAT : per Point After Touchdown
PAT Miss : per Point After Touchdown Missed
FG Made : per Field Goal Made
FG Miss : per Field Goal Missed
FG 40-49 Yds : per Field Goal made, 40 - 49 Yards
FG 50+ Yds : per Field Goal made 50 Yards or longer

FIG. 8

AMFL Alma Mater Football League

1100

• Register  • Description  • Login

Game Description and Play | Key Strategies

1. Know who is hot!
Which athlete is putting up the big numbers?

2. Know your school's opponent.
Is the opponent adept at stopping the run or pass?
Has the opposing coach told the press that they will try to neutralize one of your school's athletes?

3. Know who's injured.
Stay on top of the latest info to see who is injured.

4. Choose wisely when to use the top starters.
Use them all while they are healthy or save a few for games later in the season against tougher opponents?

5. Pick consistent stat getter positions or go with high risk high reward positions.
TE, DT and CB positions have higher multipliers for their stats. Use them when you need to make up ground and hope for a big game.

6. Know when to use the top starters and the double points 'star' athlete.
If all of the top starters are used at the beginning, then you will be left with backup athletes, who play less and garner less stats.

7. Know who to use at the end of the season to give you a chance to catch up.
If you exhausted all of an athletes starts on your roster it will be visible to all players in your league. A team that needs to gain ground on another team can choose players that the other team can't use for a chance to catch up.

8. Leave top players available for the bowl game. Try to maximize your regular season points while still leaving a chance to win your bowl game.

9. Use caution when picking the kicker for your roster: they have the highest probability of scoring negative points.

TEAM BASED FANTASY SPORT CONTEST

CROSS-REFERENCE TO RELATED APPLICATIONS

The present application claims the benefit of a commonly assigned provisional patent application entitled "Team Based Fantasy Sport Contest," which was filed on Aug. 25, 2006 and assigned Ser. No. 60/840,182. The entire contents of the foregoing provisional patent application are incorporated herein by reference.

BACKGROUND

1. Technical Field

The present disclosure relates to contests and games. More particularly, the present disclosure relates to systems and methods for hosting and conducting contests between participants who assemble respective so-called 'fantasy' teams, the rosters of which consist of individuals selected from a predetermined pool of actual athletes, and who compete with one another in a ranking arrangement based on statistics derived from the actual performance of such athletes on the field of play.

2. Background Art

Most sports enthusiasts find enjoyment in attending contests between amateur and professional sports teams, viewing such events on television, or listening to them via radio. Some true fans occupy a fair amount of the time interval between sports contests involving their favorite teams and players with discussing recent games, comparing notable athletic performances, and contemplating the likelihood of future wins and losses; in other words, more or less immersing themselves in the pleasant distractions of the sports world. Currently, so-called "fantasy" sport contests provide such fans, as well as others, with numerous outlets for their enthusiasm and passion. For example, the interactive contest system disclosed in U.S. Pat. No. 5,018,736 to Pearson et al. permits competition among an unlimited number of participants, each of which selects a team roster. Each participant's team roster is evaluated on a periodic basis based on a formula for calculating scores that employs statistics which reflect the actual performances of the roster members, and team roster totals are compared for discrete periods of competition to determine which participants have accumulated the highest scores.

One shortcoming associated with such fantasy sports contests is that, to be competitive, participants must often develop detailed knowledge of the statistics, capabilities, and current status of a large number of players, and/or of teams to which such players belong, not all of which will typically be of particular interest to any one participant. In addition, it can be difficult and time-consuming to manage or administer such contests based on a variety of factors, including but not limited to: 1) the sheer number of sources (e.g., game results/box scores) from which statistics relating to the roster members' performance (and bearing on the ultimate ranking of the participants) are often drawn, and 2) the staggered and unpredictable availability of such statistics (e.g., due to the differences in lengths of different games, different game starting times and time zones in which games are played, possibility of cancellation of games due to inclement weather or other complications, etc.). Annoyance, delays, and confusion can result, any or all of which can have the predictable effect of tempering the pleasure of participating in such contests. Thus, despite efforts to date, a need remains for fantasy sport contests that reduce opportunities for annoyance, delays, confusion, complication etc., while still preserving the pleasure and enjoyment generally inherent in athletic competition.

SUMMARY OF THE DISCLOSURE

In accordance with embodiments of the present disclosure, a method is disclosed of providing a fantasy sport contest, in accordance with rules wherein a plurality of participants are permitted to populate respective fantasy rosters with actual athletes for purposes of competing with each other based on corresponding real-life field-of-play performances of the actual athletes populating the respective fantasy rosters. The method includes restricting a population of a first fantasy roster for a first participant to actual athletes who are teammates on a first real-life team and measuring a corresponding real-life field of play performance of the actual athletes on the first fantasy roster, restricting a population of a second fantasy roster for a second participant to actual athletes who are teammates on a second real-life team and measuring a corresponding real-life field-of-play performance of the actual athletes on the second fantasy roster, establishing a ranking as between the first participant and the second participant based on the respective performance measurements, and displaying the ranking. In some embodiments, the first real-life team and the second real-life team are the same real-life team. In other embodiments, the first real-life team and the second real-life team are different real-life teams, and the performance measurements may be from a game involving the different real-life teams playing each other, or from different respective games respectively involving the different real-life teams playing respectively different teams. Multiple such measurements may be made in pairs over time with respect to the actual athletes of the first and second rosters in a head-to-head competition arrangement. Establishing a ranking may then further include declaring a winner and a loser or declaring a tie with respect to each such pair of measurements made. Displaying the ranking may then include displaying a cumulative accounting of such wins, losses, and ties. Establishing a ranking may include comparing a size of the measurement associated with the first fantasy roster with a size of the measurement associated with the second fantasy roster, and determining a ranking order for the first and second participants according to the measurement size comparison.

The contest may span a series of real-life games, and may further include requiring the first and second participants to change the respective first and second rosters by limiting an eligibility of any particular such actual athletes to populate any such roster to at least one less real-life game than a total number of said real-life games comprising said series thereof. Each of the first real-life team and the second real-life team may be a college football team, and each of the performance measurements may be from a postseason bowl game for the respective college football team.

The method may further include permitting each of the first and the second participants to designate at least one actual athlete populating the respective first and second rosters as a star player, and establishing a ranking may include bias, such that respective real-life field-of-play performances associated with an actual athlete designated as a star player may be caused to have a proportionately greater degree of influence on a ranking outcome as compared to a respective real-life field-of-play performance of similar quality but associated with an actual athlete that is not so designated. Establishing a ranking may include subjecting respective results of the measurements to a weighting system adapted to equalize field-of-play performance comparisons as across different positions played by the actual athletes. Subjecting respective results of the measurement to a weighting system may include applying one or more measurement multipliers, applying one or more bonuses, and/or applying a combination thereof.

Each of the first and second real-life teams may be selected a football team, a soccer team, a baseball team, a basketball team, or a hockey team. For example, Each of the first and second real-life teams may be a football team, and each of the first and second contest participants, in populating the respective first and second rosters, may be required include a plurality of actual athletes playing respective positions on an offensive squad of the football team, and a plurality of actual athletes playing respective positions on a defensive squad of the football team.

The method may further include wherein the plurality of actual athletes playing respective positions on an offensive squad of the football team include actual athletes playing quarterback, running back, fullback, tailback, split end, tight end, wide receiver, offensive lineman, and/or kicker. The plurality of actual athletes playing respective positions on a defensive squad of the football team may include actual athletes playing safety, cornerback, linebacker, defensive tackle, defensive end, and/or punter. Each of the first and second contest participants, in populating the respective first and second rosters, may further be required to include at least one actual athlete playing a respective position on a special teams squad of the football team.

In accordance with embodiments of the present disclosure, a system is provided, wherein the system includes at least one storage volume configured to receive, store, and permit retrieval with respect to content relating to a fantasy sport contest, the content being selected from a group comprising participant information, real-life team information, participant rankings, and a combination thereof. The system further includes a host server for interacting with the at least one storage volume for storing and retrieving the content relating to a fantasy sport contests, the host server being configured to apply rules wherein a plurality of participants are permitted to populate respective fantasy rosters with actual athletes for purposes of competing with each other based on corresponding real-life field-of-play performances of the actual athletes populating the respective fantasy rosters, restrict a population of a first fantasy roster for a first participant to actual athletes who are teammates on a first real-life team, restrict a population of a second fantasy roster for a second participant to actual athletes who are teammates on a second real-life team, establish a ranking as between the first participant and the second participant based on real-life field-of-play performances of the actual athletes populating the respective fantasy rosters, and display the ranking. In embodiments, the first and second real-life teams may be the same real-life team, or different real-life teams.

In accordance with embodiments of the present disclosure, a computer-readable medium is provided comprising a program that, when executed by a processor, performs a method for providing a fantasy sport contest. The method includes enforcing rules wherein a plurality of participants are permitted to populate respective fantasy rosters with actual athletes for purposes of competing with each other based on corresponding real-life field-of-play performances of the actual athletes populating the respective fantasy rosters, restricting a population of a first fantasy roster for a first participant to actual athletes who are teammates on a first real-life team, restricting a population of a second fantasy roster for a second participant to actual athletes who are teammates on a second real-life team and measuring a corresponding real-life field-of-play performance of the actual athletes on the second fantasy roster, establishing a ranking as between the first participant and the second participant based on real-life field-of-play performances of the actual athletes populating the respective fantasy rosters, and displaying the ranking.

BRIEF DESCRIPTION OF THE DRAWINGS

To assist those of ordinary skill in the relevant art in making and using the systems and methods disclosed herein, reference is made to the appended drawings, wherein:

FIG. 7 is a table containing contest content with respect to performance points awarded for players playing different positions according to the present disclosure;

FIG. 8 is a legend for use in interpreting the information of FIG. 7;

FIG. 11 is an illustration of an exemplary embodiment of still another page for a fantasy sport contest website in accordance with embodiments of the present disclosure.

Figure 1:
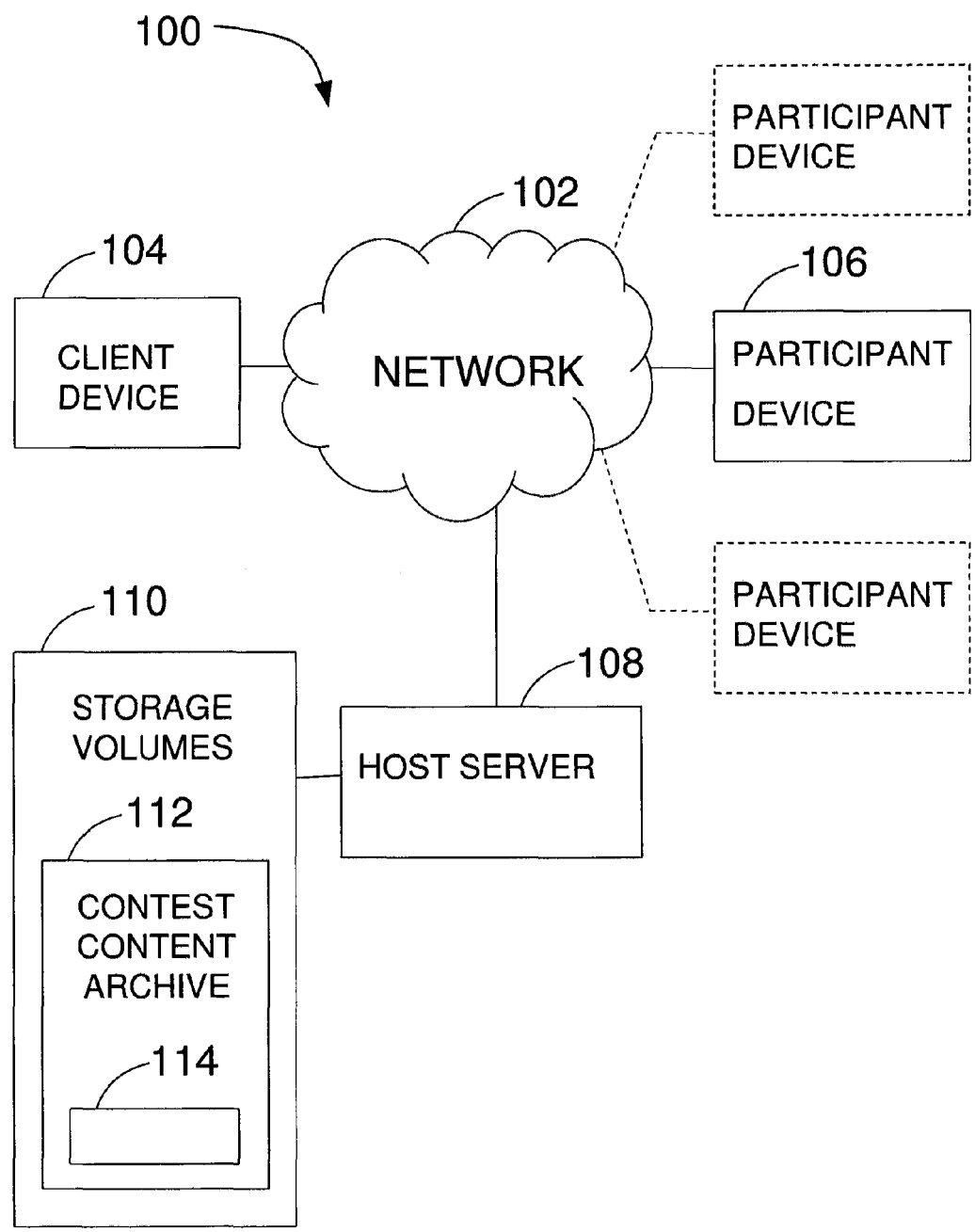
FIG. 1 is a block diagram depicting an exemplary embodiment of a computer network in accordance with exemplary embodiments of the present disclosure.

While the present invention is described herein by way of example using several embodiments and illustrative drawings, those skilled in the art will recognize that the present invention is not limited thereto. Headings used herein are for organizational purposes only and are not meant to be used to limit the scope of the description. As used throughout this application, the word 'may' is used in a permissive sense (i.e., meaning having the potential to) rather than the mandatory sense (i.e., meaning must). Similarly, the words 'include,' 'including,' and 'includes,' mean including, but not limited to.

DESCRIPTION OF EXEMPLARY EMBODIMENTS

A detailed description of will now be provided, including specific examples of apparatus, systems and methods for making and using the present invention. It should be noted, however, that the present invention is not limited to these exemplary embodiments, which are included to enable those of ordinary skill in the relevant art to make and use the present invention, when the information of the present disclosure is combined with available information and technology.

Some sports enthusiasts are so enamored of their favorite team as to direct so large a measure of their attention to the activities and games of that team and its players as to prevent them from gaining similar insights or perspective with respect to other teams. For example, such individuals may be reasonably knowledgeable about teams that their favorite team plays on a regular basis, but it is just as likely that, due to a general lack of time, a lack of interest, or both, they will fail to achieve anything more than a passing familiarity with respect to the comings and goings of most other teams. Truly deserving of the moniker 'fan' (i.e., as derived from the term 'fanatic'), such people arguably meet the most important criteria for participation in a fantasy sports league or contest—a true love of the game and its players. In accordance with embodiments of the present disclosure, such fans may now participate in fantasy sports contests in which their lopsided interest in one team, rather than being a drawback, may instead provide a strong competitive advantage.

Embodiments of the present disclosure include a contest in which a participant, in populating their fantasy sports team roster, is restricted, in terms of the athletes from which they are permitted to select for such purpose, to a list of players, all of whom play for the same real life (e.g., as opposed to fantasy) team. The rules of such a contest may provide that the real life team from which each contest participant must so select athletes is the same for each participant. For example, each participant may be limited or restricted to so choosing from among those athletes currently on the active roster of the Purdue Boilermakers football team. Alternatively, or in addition, the rules of such a contest may provide that the real life team from which each contest participant must so select athletes may be different as between some or all of the different participants. For example, at least one participant may be limited or restricted to so selecting from among those athletes currently on the active roster of the Purdue Boilermakers football team, wherein such participant may agree, or positively elects (e.g., via self-selection) to be so restricted by virtue of a personal preference for the Boilermakers, and at least one other participant may be limited or restricted to so selecting from among those athletes currently on the active roster of the Penn State Nittany Lions football team (e.g., again based on personal preference). Various other examples are possible, including wherein the rules of such a contest provide for multiple real-life teams being included in a contest or across a plurality of contests, wherein from each of which real-life teams, multiple participants may be required to select athletes.

Turning now to the potential bases upon which participant rankings or standings may be determined, the rules of such a contest may provide that participants compete and are ranked on the basis of point totals accumulated over the course of a season. For example, individual participant point totals from a current week's football game or games may be added to corresponding cumulative point totals derived from previous games during the regular season, and to the extent a given participant's cumulative point total passes that of another participant's cumulative point total, the same may be reflected in a change in the rankings as between such participants upon the next update of such rankings. Alternatively, or in addition, the rules of such a contest may be such that participants are permitted to compete and are ranked on the basis of wins, losses, and ties arising from game-day matchups between predetermined participants. For example, from week to week during a football season, participants may be grouped into pairs according to a predetermined schedule to introduce aspects of the so-called 'head-to-head' competition becoming more and more popular among fantasy sports enthusiasts. Further examples are possible.

FIG. 1 is a block diagram description of an exemplary embodiment of a computer network 100 in accordance with embodiments of the present disclosure. The computer network 100 may include a network 102. The network 102 may comprise a communication system that connects computer systems by wire, cable, fiber optic, and/or wireless links facilitated by various types of well-known network elements, such as hubs, switches, routers, and the like. The network 102 may employ various well-known protocols to communicate information.

The computer network 100 may further include a client device 104, a participant device 106, and a host server 108, coupled to each other via the network 102. The host server 608 may further host a content administration service for administering contest content with respect to a storage volume, and a content access service for administering access to such contest content stored on a storage volume. In turn, the client device 104 may include a content administration agent present on the client device for interacting with the host server 108 in the administration of contest content with respect to a storage volume, and the participant device 106 may include a content access agent present on the participant device 106 for interacting with the host server 108 in accessing contest content stored on a storage volume. The host server 108 may further be configured to manage one or more storage volumes 110. Each of the one or more storage volumes 110 may comprise any type of block-backed storage areas and may be implemented using any type of storage system or storage systems, such as a disk drive system, a tape drive system, or a combination thereof. A disk drive system may include, for example, one or more storage disks, e.g., and array of storage disks, and/or a redundant array of storage disks.

The storage volumes 110 may store a contest content archive 112 for storing contest content information. Such information with regard to contest content may be lodged in the contest content archive 112 in the form of a plurality of archive entries 114, each of which may contain contest content information of a particular (e.g., different) type. The host server 108 may be configured to communicate with the contest content archive 112, including updating the contest content archive to cause the corresponding archive entries 114 to reflect new information relating to the particular contest content information type associated with such archive entries 114, and to retrieve such information as directed or as needed.

Figure 2:
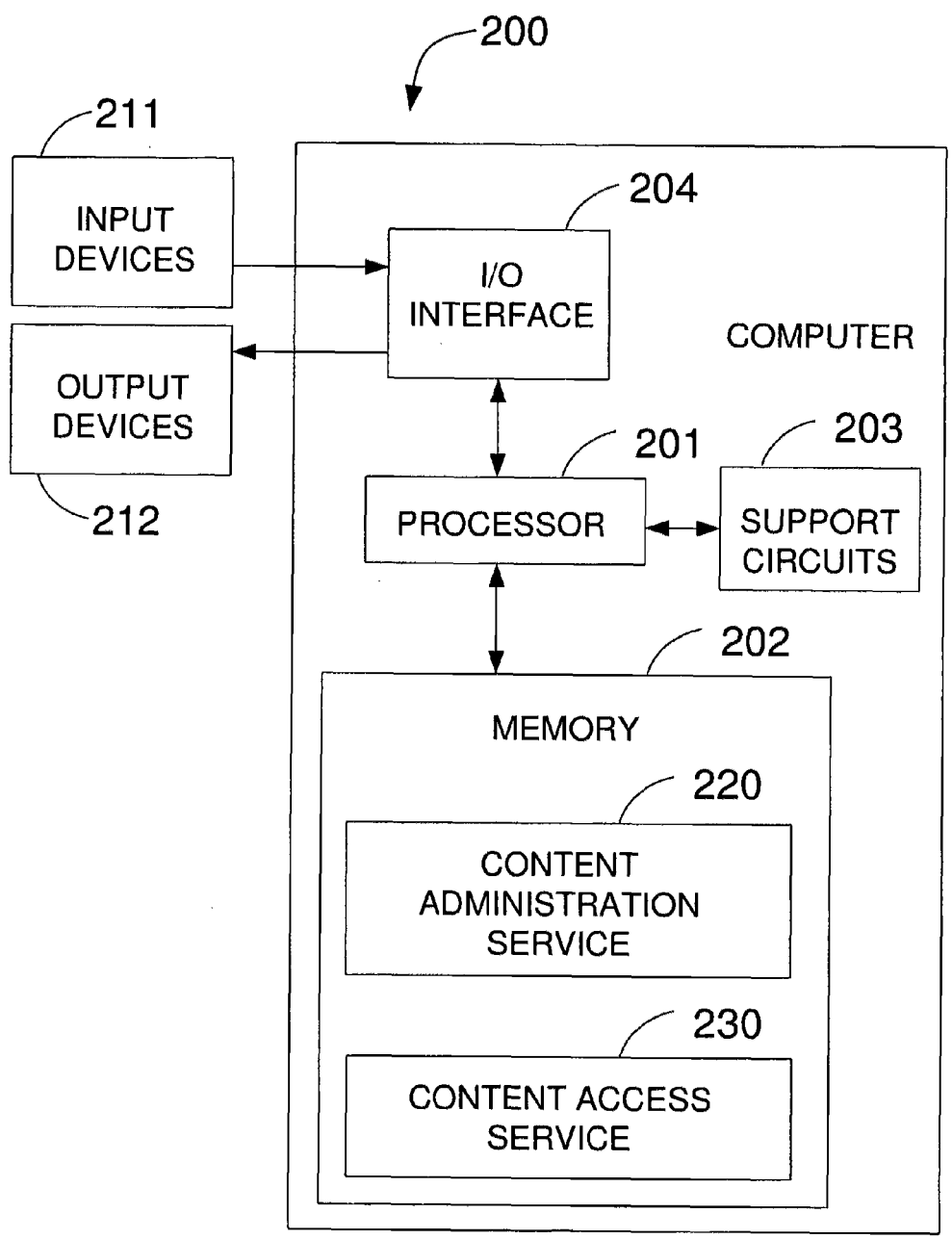
FIG. 2 is a block diagram depicting an exemplary embodiment of a computer system in accordance with exemplary embodiments of the present disclosure.

FIG. 2 is a block diagram depicting an exemplary embodiment of a computer system 200 in accordance with embodiments of the present disclosure. The computer system 200 may be used to implement the host server 108 in FIG. 1. The computer system 200 includes a processor 201, a memory 202, various support circuits 203, and an I/O interface 204. The processor 201 may include one or more known microprocessors known in the art. The support circuits 203 for the processor 201 may include conventional cache, power supplies, clock circuits, data registers, I/O interfaces, and the like. The I/O interface 204 may be directly coupled to the memory 202 or coupled through the processor 201. The I/O interface 204 may also be configured for communication with a network, with various storage devices, as well as other types of input 211 and output devices 212 (e.g., mouse, keyboard, display, etc.). The memory 202 may store processor-executable instructions and/or data that may be executed by and/or used by the processor 201. These processor-executable instructions may comprise hardware, firmware, software, and the like, or some combination thereof.

Modules having processor-executable instructions that are stored in the memory 202 may include a content administration service 220, and a content access service 230. The content administration service 220 enables the host server 108 (FIG. 1) or the computer system 200 to administer (e.g., to execute additions to, deletions from, and changes to) contest content with respect to the contest content archive 112 (FIG. 1) stored on the storage volumes 110 (FIG. 1), and to interact for the same purpose with a corresponding content administration agent present on the client device 104 (FIG. 1). The content access service 230 enables the host server 108 (FIG. 1) or the computer system 200 to administer participant access to contest content with respect to the contest content archive 112 (FIG. 1) stored on the storage volumes 110 (FIG. 1), and to interact for the same purpose with a corresponding content access agent present on the participant device 106 (FIG. 1). The computer system 200 may be programmed with an operating system, which may be OS/2, Java Virtual Machine, Linux, Solaris, Unix, Windows, Windows95, Windows98, Windows NT, Windows2000, WindowsME, WindowsXP, Windows Server, Symbian OS, WindowsCE, Windows Vista, and Mac OS, among other known platforms. At least a portion of the operating system may be disposed in the memory 202. The memory 202 may include one or more of the following: random access memory, read only memory, magneto resistive read/write memory, optical read/write memory, cache memory, magnetic read/write memory, and the like, as well as signal-bearing media as described below.

Figure 3:
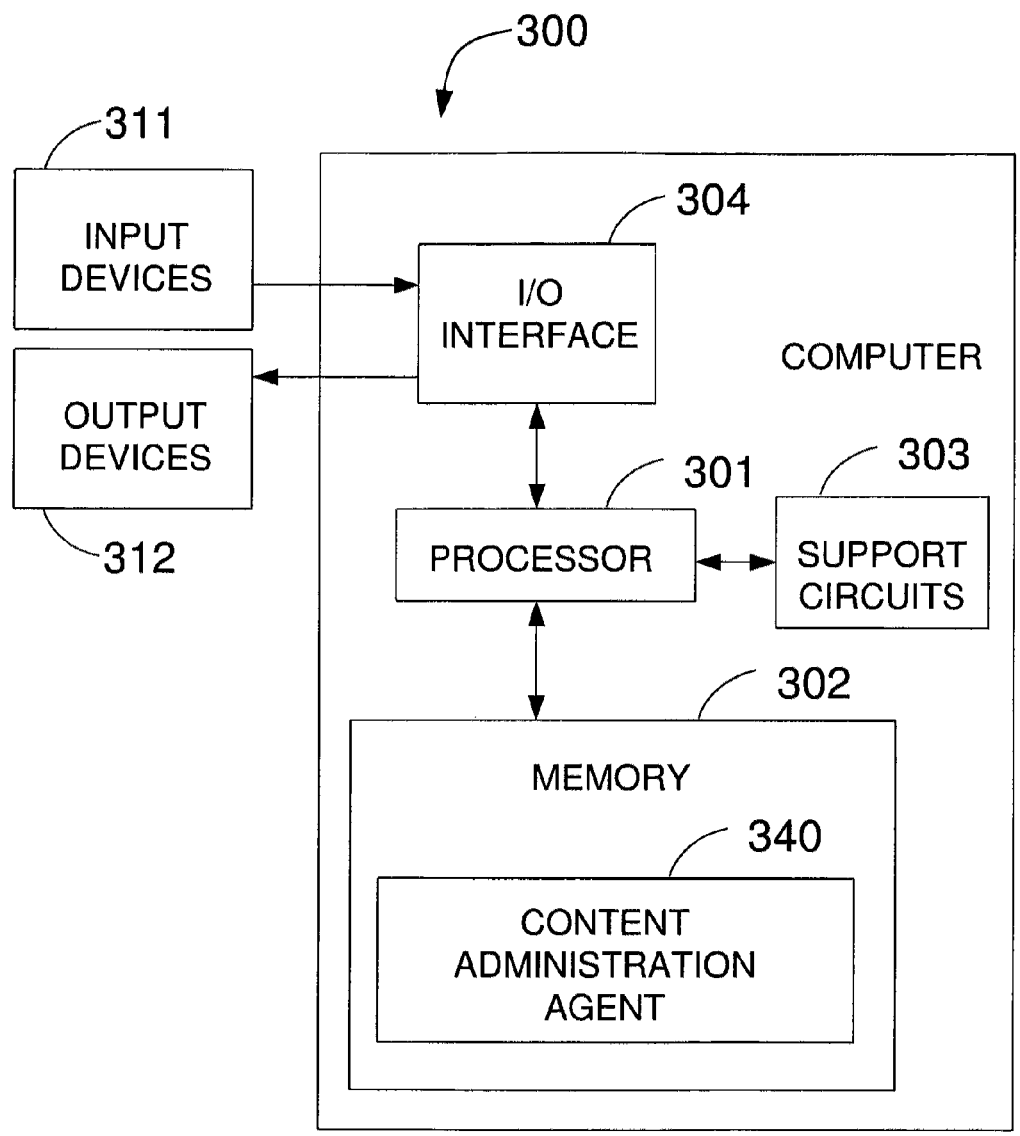
FIG. 3 is a block diagram depicting an exemplary embodiment of another computer system in accordance with exemplary embodiments of the present disclosure.

FIG. 3 is a block diagram depicting an exemplary embodiment of a computer system 300 in accordance with one or more aspects of the present disclosure. The computer system 300 may be used to implement the client device 104 in FIG. 1. The computer system 300 may include a processor 301, a memory 302, various support circuits 303, and an I/O interface 304. The processor 301 may include one or more microprocessors known in the art. The support circuits 303 for the processor 301 may include conventional cache, power supplies, clock circuits, data registers, I/O interfaces, and the like. The I/O interface 304 may be directly coupled to the memory 302 or coupled through the processor 301. The I/O interface 304 may also be configured for communication with a network, with various storage devices, as well as other input type 311 and output devices 312 (e.g., mouse, keyboard, display, microphone, speaker, etc.). The memory 302 may store processor-executable instructions and/or data that may be executed by and/or used by the processor 301. These processor-executable instructions may comprise hardware, firmware, software, and the like, or some combination thereof.

Modules having processor-executable instructions that are stored in the memory 302 may include a content administration agent 340. The content administration agent 340 enables the client device 104 (FIG. 1) or the computer system 300 to interact with the host server 108 (FIG. 1) or the computer system 200 (FIG. 2) to administer (e.g., to execute additions to, deletions from, and changes to) contest content information with respect to the contest content archive 112 (FIG. 1) stored on the storage volumes 110 (FIG. 1). In embodiments, the content administration agent 340 can be embodied by an appropriate internet browser, such as Microsoft Explorer, Netscape Navigator, or Mac Safari. Other embodiments are possible. The computer system 300 may be programmed with an operating system, which may be OS/2, Java Virtual Machine, Linux, Solaris, Unix, Windows, Windows95, Windows98, Windows NT, Windows2000, WindowsME, WindowsXP, Windows Server, Symbian OS, WindowsCE, Windows Vista, and Mac OS, among other known platforms. At least a portion of the operating system may be disposed in the memory 302. The memory 302 may include one or more of the following: random access memory, read only memory, magneto resistive read/write memory, optical read/write memory, cache memory, magnetic read/write memory, and the like, as well as signal bearing media as described below.

Figure 4:
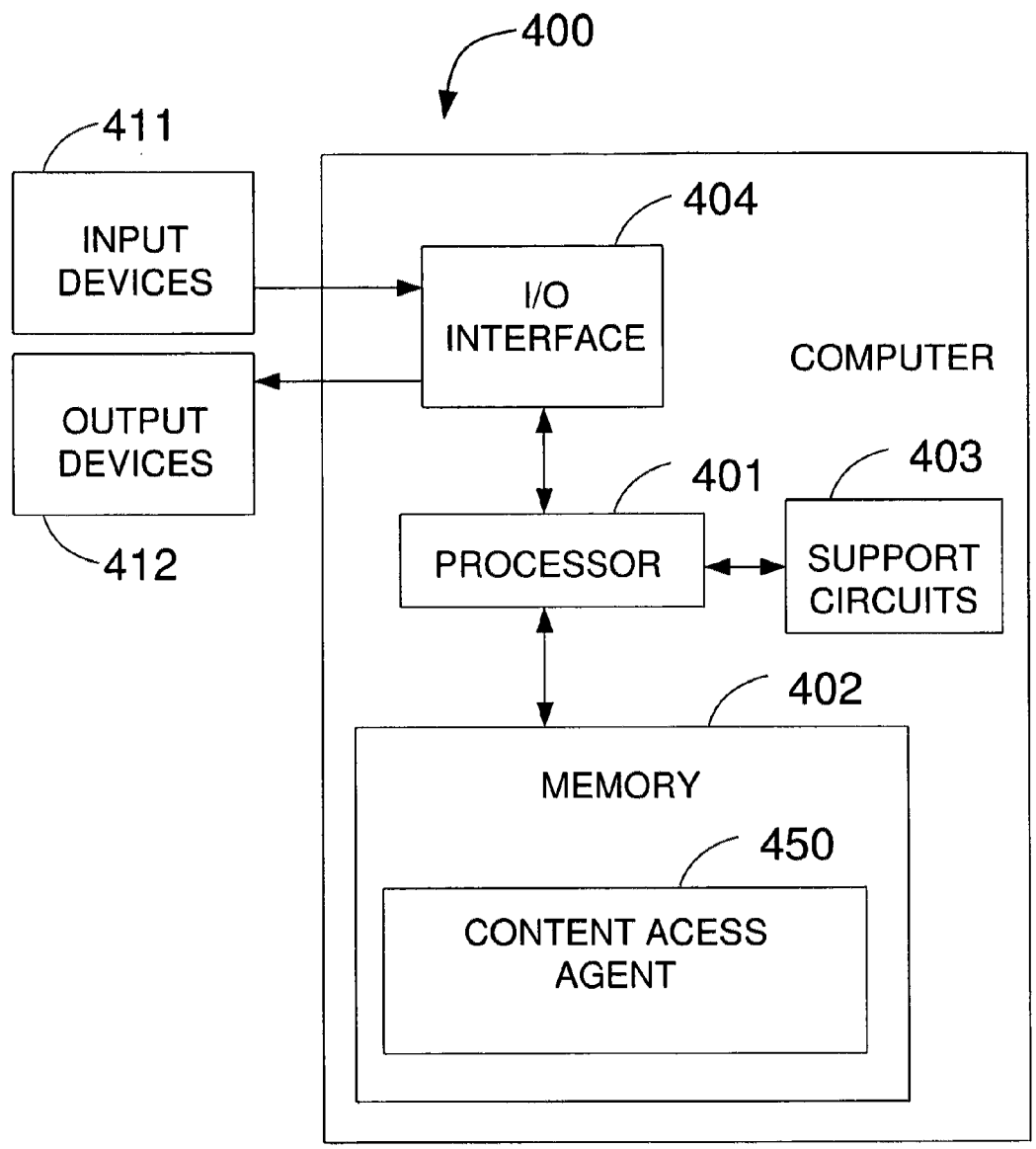
FIG. 4 is a block diagram depicting an exemplary embodiment of still another computer system in accordance with exemplary embodiments of the present disclosure.

FIG. 4 is a block diagram depicting an exemplary embodiment of a computer system 400 in accordance with embodiments of the present disclosure. The computer system 400 may be used to implement the participant device 106 in FIG. 1. The computer system 400 may include a processor 401, a memory 402, various support circuits 403, and an I/O interface 404. The processor 401 may include one or more microprocessors known in the art. The support circuits 403 for the processor 401 may include conventional cache, power supplies, clock circuits, data registers, I/O interfaces, and the like. The I/O interface 404 may be directly coupled to the memory 402 or coupled through the processor 401. The I/O interface 404 may also be configured for communication with a network, with various storage devices, as well as other input type 411 and output devices 412 (e.g., mouse, keyboard, display, microphone, speaker, etc.). The memory 402 may store processor-executable instructions and/or data that may be executed by and/or used by the processor 401. These processor-executable instructions may comprise hardware, firmware, software, and the like, or some combination thereof.

Modules having processor-executable instructions that are stored in the memory 402 may include a content access agent 450. The content administration agent 450 enables the participant device 106 (FIG. 1) or the computer system 400 to interact with the host server 108 (FIG. 1) or the computer system 200 (FIG. 2) to access contest content information with respect to the contest content archive 112 (FIG. 1) stored on the storage volumes 110 (FIG. 1). In embodiments, the content access agent 450 can be embodied by an appropriate internet browser, such as Microsoft Explorer, Netscape Navigator, or Mac Safari. In other embodiments, the content access agent 450 can be embodied by a specially configured software application. Other embodiments are possible. The computer system 400 may be programmed with an operating system, which may be OS/2, Java Virtual Machine, Linux, Solaris, Unix, Windows, Windows95, Windows98, Windows NT, Windows2000, WindowsME, WindowsXP, Windows Server, Symbian OS, WindowsCE, Windows Vista, and Mac OS, among other known platforms. At least a portion of the operating system may be disposed in the memory 402. The memory 402 may include one or more of the following: random access memory, read only memory, magneto resistive read/write memory, optical read/write memory, cache memory, magnetic read/write memory, and the like, as well as signal bearing media as described below.

Figure 5:
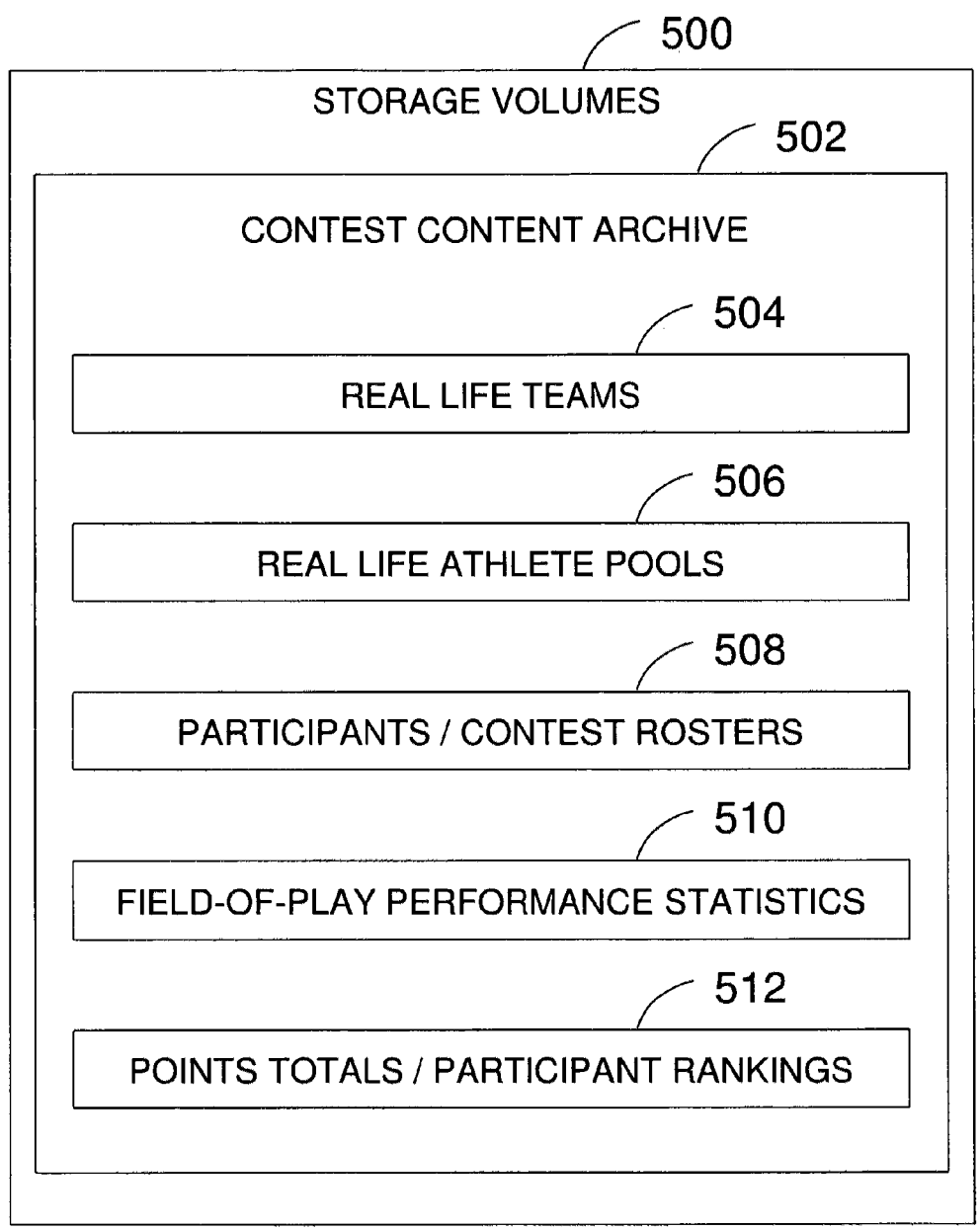
FIG. 5 is a block diagram depicting an exemplary embodiment of storage volumes in accordance with exemplary embodiments of the present disclosure.

FIG. 5 is a block diagram depicting an exemplary embodiment of storage volumes 500 in accordance with embodiments of the present disclosure. The storage volumes 500 may be used to implement the storage volumes 110 in FIG. 1. The storage volumes 500 include a contest content archive 502 in accordance with embodiments of the present disclosure. The contest content archive 502 may be used to implement the contest content archive 112 in FIG. 1. The contest content archive 502 may include a plurality of archive entries, including an archive entry 504 corresponding to real-life sports teams to which contest participants, in populating their fantasy sports team roster, may be restricted in terms of the athletes they are permitted to select for such purpose. For example, the archive entry 504 may include information with respect to the following college football teams that may be included in one or more contests: The Purdue Boilermakers, the Penn State Nittany Lions, the Wisconsin Badgers, the Iowa Hawkeyes, the Michigan Wolverines, the Ohio State Buckeyes, and the Notre Dame Fighting Irish. In addition, or alternatively, the archive entry 504 may contain information with respect to other real-life teams, including real-life professional football teams (e.g., the New England Patriots, the New York Giants, football teams based in Canada, etc.), and real-life teams in sports other than football (e.g., baseball, soccer, basketball, hockey, etc.). The archive entry 504 may be used to implement the archive entry 114 in FIG. 1. The archive entry 504 may include game schedule content that may include full information with respect to the present or upcoming regular season including dates, times, opponents, and home or away information with respect to all included teams. The archive entry 504 may further include player roster content that may include full information with regard to the players/teammates on the roster of all included teams, including names, weights, positions played, performance statistics in past football games and seasons, home town, and other teams for which a player has played, injury reports, projected starters, redshirt status, rankings of backup and substitute players (e.g., depth chart information), and current player suspensions (e.g., whether academic, disciplinary, or otherwise, along with the expected length of such suspensions). Other types of information relating to the included teams may further be contained within the archive entry 504.

The contest content archive 502 may further include an archive entry 506 containing information relating to lists or pools of those athletes and teammates appearing on the rosters of the included real-life teams from which participants may be permitted to choose when assembling their respective fantasy sport contest rosters. Such lists or pools may be referred to hereinbelow as respective instances of an "athlete pool". Of the players appearing, for example, on the roster of the Purdue Boilermakers football team at any given time, it may be that not all will be among the athletes populating the corresponding athlete pool. One reason for this circumstance may be that participants in a contest in accordance with the present disclosure are generally inclined to select players most likely to have a positive impact on the Boilermaker's success on the field of play, and so they will be unlikely to select for inclusion in their respective contest rosters such players as, e.g., redshirt freshmen who have never even entered a game, or marginal players (e.g., practice players) who may themselves already be resigned to the fact that their on-the-field role for the Boilermakers will be extremely limited. The best players on the Boilermakers roster, of course, may all be among the individuals populating the athlete pool, and as such are all at least nominally available for selection by participants for purposes of populating their respective fantasy rosters.

The contest content archive 502 may further include an archive entry 508 that may contain information relating to the participants involved in a given contest in accordance with embodiments of the present disclosure. For example, the archive entry 508 may contain information relating to the status of such participants, such as with respect to the number of times a given participant may have included particular players in their fantasy roster, and/or which players remain available for use by a given participant for inclusion in their next fantasy roster. For another example, the archive entry 508 may reflect information relating to fantasy rosters assembled and submitted by the participants in anticipation of the start of the next game on the Boilermakers' regular season schedule. For another example, the archive entry 508 may reflect information relating to respective 'current' content rosters assembled and submitted (and/or revised) by the participants in anticipation of the start or 'kickoff' of the very next game on the Boilermakers' schedule, as well as an archive of respective fantasy rosters submitted in the past by each participant in anticipation of previous Boilermakers games that may have already taken place during the present football season (e.g., fantasy rosters as they stood as of the kickoff of each previous Boilermakers game). As stated above, in accordance with embodiments of the present disclosure, when participants assemble their respective fantasy rosters, each such participant may be restricted to athletes and teammates whose names appear in a corresponding athlete pool. In embodiments, the fantasy rosters may be changed at any time prior to kickoff of the corresponding Boilermakers game, but once such kickoff has occurred, the respective fantasy rosters may all be frozen (e.g., while the game is being played). One reason for this may be to simplify the task of assembling statistics for the purposes of ranking the participants. Another reason may be to establish finality as to the fantasy rosters, and to put an end to adjustments and 'jockeying for position' such that the participants (all of whom are presumably fans of the Boilermakers) will be free to simply enjoy the game (while also rooting for the players currently on their fantasy rosters, of course). In embodiments, further relevant restrictions may include the following: 1) Fantasy rosters may include a maximum of nine players; 2) No more than four athletes who play a position on the Boilermakers' offensive squad, and no more than five athletes who play a position on the Boilermakers' defensive squad, are permitted to appear on any given fantasy roster at one time, such that a full complement of nine players on a fantasy roster will always consist of four players on offense, and five players on defense; and 3) No Boilermaker player may appear on any participant's fantasy roster more than 7 times over the course of a 13 game season (e.g., 12 game regular season and a bowl game), or more than 6 times over the course of an 11 or 12 game season (e.g., 11 game regular season and a bowl game). In embodiments, each participant may be permitted to designate one player on their respective fantasy roster who plays on the Boilermakers' offensive squad as an 'offensive star', and one player on their respective fantasy roster who plays on the Boilermakers' defensive squad as a 'defensive star'. In such circumstances, the impact of the real-life field-of-play performance of an actual athlete designated as an 'offensive star' or 'defensive star' may be greater (e.g., double) the impact of an actual athlete not so designated. Otherwise, the participants may be ranked based on the collective performance of the actual athletes populating their respective fantasy roster.

The contest content archive 502 may further include an archive entry 510 that may contain information relating to statistics reflective of the respective performances of the Boilermakers players in the respective athlete pool during the most recent game played by the Boilermakers. Such statistics may cover a broad range of field-of-play performance indicia for both offensive and defensive players, and may include: tackles, ten tackles or more made in a game, sacks, interceptions made, passes broken up, fumbles, fumbles recovered, fumbles forced, defensive touchdowns, blocked kicks, safeties, touchdowns, receptions, reception yards, rushing yards, completions, passing yards, interceptions thrown, field goals made, field goals missed, point-after-touchdown made, point-after-touchdown missed, field goals made from a distance of from forty (40) to forty-nine (49) yards, and field goals made from a distance of more than fifty (50) yards.

The contest content archive 502 may further include an archive entry 512 that may contain information relating to points totals and participant rankings. More particularly, the fifth database may contain: 1) point totals reflective of the respective performance of the Boilermakers players populating the respective athlete pool during the most recent game played by the Boilermakers; 2) point totals cumulatively reflective of the performance of the Boilermakers players appearing on the respective fantasy roster of each of the participants during the most recent game played by the Boilermakers; 3) a list of participants, ranked in order of the respective point totals described in 2) above; 4) point totals cumulatively reflective of the performance of the Boilermakers players appearing on the respective fantasy rosters of each of the participants during each and every one of the Boilermakers games played to day in the present football season; and/or 5) a list of participants, ranked in order of the respective cumulative point totals arising from their respective historical fantasy rosters described in 4) above. Additionally, and/or in the alternative, the archive entry 512 may contain information relating to participant rankings broken down in terms of wins, losses, and ties in conjunction with a contest organized not around cumulative point totals, but rather around head-to-head contests between participants and the results of such head-to-head contests, as described in greater detail hereinafter.

Referring again to FIG. 1, an administrator of a contest or contests in accordance with embodiments of the present disclosure, and/or an individual tasked with maintaining or updating information contained on the host server 108, may interact with the host server 108 via the client device 104 coupled thereto, e.g., as shown and described hereinabove with reference to FIGS. 1 and 3. For example, an administrator, using the client device 104 (e.g., using their own personal computer, or other computer equipment suitable for interacting with the host server 108 may be permitted to access the host server 108) for purposes of: 1) updating the archive entry 504 (FIG. 5) relating to real life sports teams to which the contest participants are limited or restricted in terms of the athletes they are permitted to select for purposes of assembling or populating their respective fantasy rosters, including adding content with respect to news coverage about the team, injury reports, roster update, game tape or other video, and/or links of potential use to participants in assembling their rosters; 2) establishing or making adjustments to the specific contents of archive entry 506 (FIG. 5) relating to lists or pools of those athletes/teammates of the included teams which are, at least nominally (e.g., before such list is reduced by virtue of participants reaching the respective limits on the selection of specific players as fantasy roster players) available for purposes of the participants populating their rosters (e.g., to help the participants avoid wasting time on those players least likely to participate in the upcoming game by virtue of being too low on the depth chart, or ineligible for play for one reason or another); and/or 3) adding (e.g., to the contents of archive entry 512 (FIG. 5)) such commentary or other directions or information as may appear appropriate, informative, useful, amusing, or otherwise inspiring or motivational to the various participants with respect to the events of a recent contest event (e.g., a game for which the participants had submitted fantasy rosters), the status of a given contest (e.g., in terms of changes to the rankings or standings as between the participants), and/or new information recently posted by the administrator (news regarding bowl game participation, head-to-head matchups, new contest features, etc.).

Still referring to FIG. 1, participants in a contest or contests in accordance with embodiments of the present disclosure may interact with the host server 108 via respective devices adapted for such purposes, e.g., wherein each such participant may use a separate instance of a participant device 106 coupled to the host server 108 as shown and described hereinabove with reference to FIGS. 1 and 4. For example, a participant, using the participant device 106 (e.g., using their own personal computer, or other computer equipment suitable for interacting with the host server 108) may be permitted to access the host server 108 for purposes of: 1) submitting an initial fantasy roster prior to the start or kickoff of the first game of the Boilermakers regular season football schedule in an update to archive entry 508 (FIG. 5); 2) revising their respective fantasy roster by deleting one or more players therefrom and adding one or more players thereto in an update to archive entry 508 and/or in advance of an upcoming game kickoff; 3) reviewing any or all of the contents of the archive entries 504, 506, 508, 510 and/or 512 (FIG. 5) as needed prior to the kickoff of a Boilermaker game in order to glean information that will help them make decisions with respect to adjusting their respective fantasy rosters with a view toward optimizing their respective point-generating potential during such game. In embodiments, participants may be specifically prevented from reviewing the content of the archive entry 508 to the extent of the precise contents of the fantasy roster selections associated with their fellow participants (e.g., their competitors) until after the time for adjusting the fantasy rosters has expired, and such fantasy rosters are thus frozen (e.g., up until the moment after kickoff of the related Boilermakers game). Such a provision may be consistent with a desire on the part of the participants to keep their fantasy roster adjustment strategies a secret, even while they continue 'tinkering' with the makeup of their previously submitted fantasy rosters up until the last few minutes before the start of the next Boilermakers game.

Figure 6:
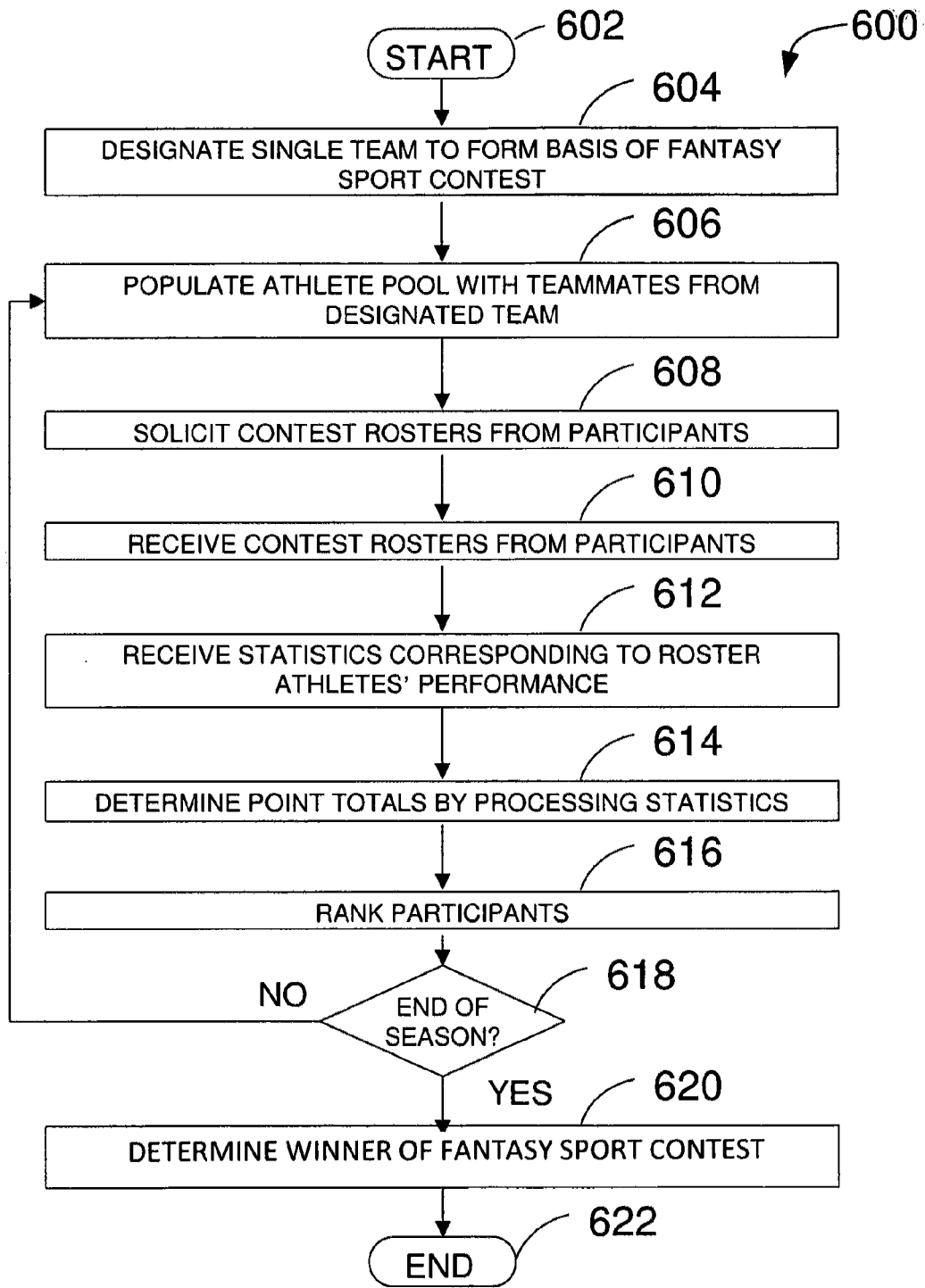
FIG. 6 is a flow diagram depicting a method for administering a fantasy sport contest in accordance with embodiments the present disclosure.

Referring now to FIG. 6, a flowchart is provided in accordance with embodiments of the present disclosure that illustrates an exemplary method 600 of conducting a fantasy sport contest. The method 600 may be adapted to be implemented by an administrator, in conjunction with related involvement by participants, by means of the computer network 100 shown and described hereinabove with reference to FIGS. 1-5. As such, the following description of the method 600 may be considered in light of the description provided hereinabove with reference to the computer network 100.

The method 600 may start with a step 602. Proceeding to a step 604, a real life team (e.g., the Purdue Boilermakers football team) is selected by the administrator and designated to form a basis for a fantasy sport contest in accordance with the present disclosure. The meaning and significance of such selection and designation is discussed in greater detail below. Referring to FIGS. 1 and 5, in the step 604, the administrator may employ the client device 104 to communicate with the host server 108 and may thereby cause the host server 108 to access the storage volumes 500 for adding information to the archive entry 504 of the contest content archive 502 (see above discussion relating to the types of such information that may be added) relating to the Boilermakers football team. The information added to the archive entry 504 by the host server 108 may be of natural interest to the participants seeking to educate themselves about the Boilermakers football team and its individual players and thereby be in a better position to compete more effectively during the course of the contest. Accordingly, such participants may access the host server 108 via their respective participant device 106 for such purposes, as described above. In embodiments of contests involving more than one real life team, the tasks and actions associated with the foregoing step 604 may further be undertaken with respect to each such additional team.

Proceeding now to a step 606, the administrator may determine those athletes from the roster of the Boilermakers football team who shall be represented in the respective athlete pool (see above discussion relating to the criteria that may be used to determine which athletes are to be included in the athlete pool, and which are not). The administrator may then cause the host server 108 to access the storage volumes 500 for adding such information to the archive entry 506 of the contest content archive 502. As discussed above, athletes or teammates from any other team than the Boilermakers football team may be excluded from the respective athlete pool. More particularly, some athletes who are teammates on the Boilermakers football team will not necessarily merit inclusion in the athlete pool (at least not initially) because of the abundance of other players far more likely to accumulate point-generating performance statistics during the upcoming game. Nevertheless, it is anticipated that, during the course of the relatively long playing season, some injuries may heal, other injuries may occur, additions and subtractions may be made to the membership of the Boilermakers football team, players may be moved into and out of either or both of the offensive and defensive starting squads and upward and downward within the related depth charts, etc. Accordingly, the administrator may cause the host server 108 to access the storage volumes 500 for making such changes to the archive entry 506 as become desirable or necessary over the course of the season based on changed circumstances. The participants may in turn regard the respective athlete pool as the primary source of information with respect to which players on the Boilermakers football team are eligible to be selected to populate their fantasy rosters, and may employ their respective participant devices 106 in conjunction with the host server 108 to gain access such information, as described above.

The next step may be a step 608. In the step 608, the administrator may employ the host server 108 (e.g., via the respective participant devices 106) to solicit from the participants in the contest their respective fantasy rosters in advance of the beginning of the next Boilermakers football game. As discussed above, in embodiments, the participants may in turn employ their participant devices 106 as well as the host server 108 to access the storage volumes 500 for a large measure of the information they will need to make final determinations as to which Boilermakers players will populate their respective fantasy rosters, including. In this regard, the storage volumes 500 (e.g., the archive entry 504 or the archive entry 506) may be employed as a repository of contest rules and/or suggested strategies (the latter being described in greater detail below) that the participants may choose to access during the course of participating in the contest and/or in deciding which players to include in their content rosters.

The method 600 may now proceed to a step 610. In the step 610, the administrator may employ the host server 108 to receive information from the participants with respect to their desired fantasy rosters. As discussed above, in embodiments, the participants may employ their participant devices 106 to transmit such information to the host server 108, which may then be caused to transmit such information (e.g., entire fantasy rosters, and/or changes thereto) to the archive entry 508 of the contest content archive 502 of the storage volumes 500, where such information is stored for future use, and/or for access as needed (and/or as authorized), by the administrator, by the host server 108, and/or by the participants themselves.

The next step of the method 600 may be a step 612. In the step 612, a game involving the Boilermakers football team begins and then concludes, generating statistics relating to the athletic performance during such game by players populating the respective athlete pool (see the description of step 606 above). Referring briefly to FIG. 1, in accordance with the step 612, the administrator may cause the host server 108 to receive the statistical information with respect to such athletic performances (e.g., via the network 102), and to transmit such information to the storage volumes 500, where such information may be stored in the archive entry 510 of the contest content archive 502 for future use, and/or for access as needed, by the administrator, by the host server 108, and/or by the participants themselves. Further in accordance with embodiments of the present disclosure, in the step 612, and during or after each game played by the Boilermakers football team, the administrator may cause the host server to update the archive entry 508 of the contest content archive 502 with respect to information about the participants relating to how many times the various participants have selected particular athletes comprising the respective athlete pool of the Boilermakers football team. As discussed above, such information can impact decisions by the various participants as to when to select those players who may be considered the best or most productive as part of their respective fantasy rosters, and when to 'save' their selection for future games. Of course, such information can also reveal when a particular participant is precluded from selecting one or more of the best players for inclusion in their respective fantasy roster for the remainder of the season. The remaining participants may choose to adjust their strategies with respect to populating their respective fantasy rosters in light of this information, thereby adding interest to the contest during the latter stages of the regular season.

A next step of the method 600 may be a step 614. In the step 614, the administrator may cause the host server 108 to calculate and/or determine point totals reflective of the field-of-play performance of the Boilermakers football team athletes populating the respective athlete pool during the most recent Boilermakers football game. For example, the administrator may cause the host server 108 to retrieve the statistical information with respect to athletic performances from the archive entry 510 of the contest content archive 502 of the storage volumes 500, process such statistics in accordance with a predetermined algorithm (see below for greater detail with respect thereto) so as to determine or calculate a related set of point totals, each point total of such set of point totals corresponding to a particular player in the athlete pool of the Boilermakers football team who made at least some net positive contribution during the recent game via their field-of-play performance. The administrator may then cause the host server 108 to transmit the set of point totals to the storage volumes 500, wherein such information may be stored in the archive entry 512 of the contest content archive 502 for future use, and/or for access as needed, by the administrator, by the host server 108, and/or by the participants themselves.

The next step of the method 600 may be a step 616. In the step 616, the administrator may cause the host server 108 to retrieve from the contest content archive 502 of the storage volumes 500: 1) the information with respect to the set of point totals corresponding to field-of-play athlete performances and contained in the archive entry 512, and 2) the information corresponding to the respective fantasy rosters of the participants and contained in the archive entry 508, and combine such information to arrive at a second set of point totals, each point total of such second set of point totals representing the 'yield' of points a particular participant obtained from the field-of-play performances of the particular athletes of the Boilermaker football team such participant selected when populating the latest iteration of their respective fantasy roster. The administrator may then cause the host server 108 to transmit the second set of point totals to the storage volumes 500, wherein such information may be stored in the archive entry 508 of the contest content archive 502. Such second set of point totals will reveal, for example, which participant gleaned the largest number of points from the various field-of-play performances of the athletes in the athlete pool of the Boilermakers football team during the most recent game. The administrator may then cause the host server 108 to utilize the second set of point totals to reveal a ranking, or to update a previous ranking, of a season-to-date ranking with respect to total points accumulated by the various participants over the course of the season. Additionally, and/or in the alternative, the administrator may then cause the host server 108 to utilize the second set of point totals to reveal a 'results' tally in which head-to-head comparisons are made between the participants of predetermined pairs of participants, and 'wins', 'losses', and/or 'ties' are determined, after which such information is utilized to reveal or update a season-to-date ranking based on related totals of such wins, losses, and/or ties.

The method 600 may proceed to a step 618. In the step 618, the administrator may cause the host server 108 to retrieve from the contest content archive 502 of the storage volumes 500 the game schedule content from the archive entry 504, and perform a determination as to whether the final game in the regular season of the Boilermakers football team has been played. If not, the method 600 may continue, wherein the next step may be the step 606 such that the method 600 may proceed with another round through the steps 606, 608, 610, 612, 614, 616, and 618 with respect to the next game on the regular schedule of the Boilermakers football team. If so, the method may proceed to a step 620. In the step 620, the administrator may cause the host server 108 to determine a winner of the contest. For example, the administrator may cause the host server 108 to determine which participant appears a the top of the respective season-long rankings or standings, and to identify such participant as the winner of the contest. The method 600 may then proceed to a step 622, at which the method 600 ends.

In accordance with embodiments of the present disclosure, the method 600 shown and described above with respect to FIG. 6 may be the subject of variations and/or modifications. For example, with respect to the step 604, instead of designating a single real-life team to form the basis of a fantasy sport contest, the contest may include multiple real-life teams (e.g., one applicant per team, two applicants per team, etc.). Referring now to the step 606, a separate athlete pool may be established with respect to each real-life team included within the contest. Alternatively in this regard, multiple similar contests may be provided, each having multiple participants, but each contest being further based on a different team (e.g., one league each dedicated to each school of the Big 10 Athletic Conference), wherein a separate winner with respect to each such contest may be declared. A global ranking across different contests organized around specific football teams may be a separate (e.g., parallel) contest in and of itself, based on cross-team cumulative points totals, or cross-team matchups (e.g., associated with the display of 'standings' to account for all the different participants and where they may fall at any given time in the standings. In some such circumstances, head-to-head matchups may be arranged as between participants participating in a league dedicated solely to one team (e.g., various pairings with respect to the Iowa Hawkeyes), which head-to-head pairings may form the basis for the league's participant comparisons throughout the regular season, and/or in some instances, only with regard to a final opportunity to compete in the context of a real-life team that has been awarded a bowl bid. For example, such final opportunity to compete may provide participants accustomed to a regular season in which competition occurs via a regular accumulation of points a chance to enjoy head-to-head competition.

To the extent participants are participating in a league in accordance with embodiments of the present disclosure and based on one real-life college football team (e.g., whether competition is based on points accumulation, or the wins, losses and ties associated with head-to-head competition) it may be that no bowl bid is awarded to the football team around which the contest or league is organized. In such cases, the season for the contest or league in which such participants are participating ends with the final regular season game of the football team involved, and such participants must 'wait on the sidelines' and watch the activities of their more fortunate colleagues until the brief bowl season and the longer off-season ends before resuming competition in a new season. With respect to the step 616, participant ranking may take place in different ways, e.g., via a straight comparison of the total number of points awarded for a particular game (e.g., all at once) or for the games of a season to date (e.g., a comparison of cumulative totals).

Referring now to FIG. 7, a series of tables 700, 702, 704, 706, and 708 is shown in accordance with embodiments of the present disclosure. The administrator of a contest in accordance with embodiments of the present disclosure may determine and/or decide upon the information contained within the tables 700, 702, 704, 706, 708 and cause the host server 108 to communicate with the storage volumes 110 for storing data representative of the tables 700, 702, 704, 706, 708 in the contest content archive 112 (e.g., as part of the archive entry 510). In accordance with the present disclosure, different points may be awarded based on the value of a particular statistical indicator, and in some cases, based on the position played by the player in question. Different player positions are indicated in a first column 710 of each of the tables 700, 702, 704, 706, 708. As shown in various columns 712, 714, 716, 718, 720, and 722 of the tables 700, 702, 704, 706, 708, in some instances, different points may be awarded to players playing different positions who execute certain plays, whereas in other instances, the same points may be awarded to players playing different positions. (FIG. 8 illustrates a legend 800 useful for interpreting abbreviations with respect to the execution of some such plays) In general, points may be awarded to (or, in some cases, taken away from) a player who: 1) tackles an opposing player, 2) amasses ten or more tackles of an opposing player, 3) tackles an opposing player for a loss, 4) sacks a quarterback, 5) makes an interception, 6) breaks up a forward pass, 7) recovers a fumble, 8) forces a fumble, 9) scores a defensive touchdown, 10) blocks a kick, 11) scores a safety, 12) scores a special teams touchdown, 13) scores an offensive touchdown, 14) completes a pass, 15) makes a reception, 16) completes a pass greater than ten yards in length, 17) makes a reception greater than ten yards in length; 18) rushes for greater than ten yards, 19) fumbles, 20) throws an interception, 21) scores a two-point conversion, 22) scores a point-after-touchdown, 23) misses a point-after-touchdown, 24) makes a field goal, 25) misses a field goal, 26) makes a field goal of between forty (40) and forty-nine (49) yards, and 27) makes a field goal of between fifty (50) and fifty-nine (59) yards. By awarding variable points to players in different positions who perform the same feats on the field of play, no single position need necessarily be an obvious source of points that will allow a participant to amass the largest total of points for a given game or a given season. As indicated above, players may receive negative points for negative achievements, such as fumbles, interceptions against, field goals missed, and point-after-touchdown missed. Kickers in particular may add or subtract many points to the cumulative total of points associated with a participant's fantasy rosters, so a participant who selects a kicker for inclusion in their fantasy roster may wish to do so with great care. In another aspect of the present disclosure, points awarded based on statistics may be weighted so as to award roughly equal points to different players performing as well as each other while playing different positions during the course of the same game.

Figure 9:
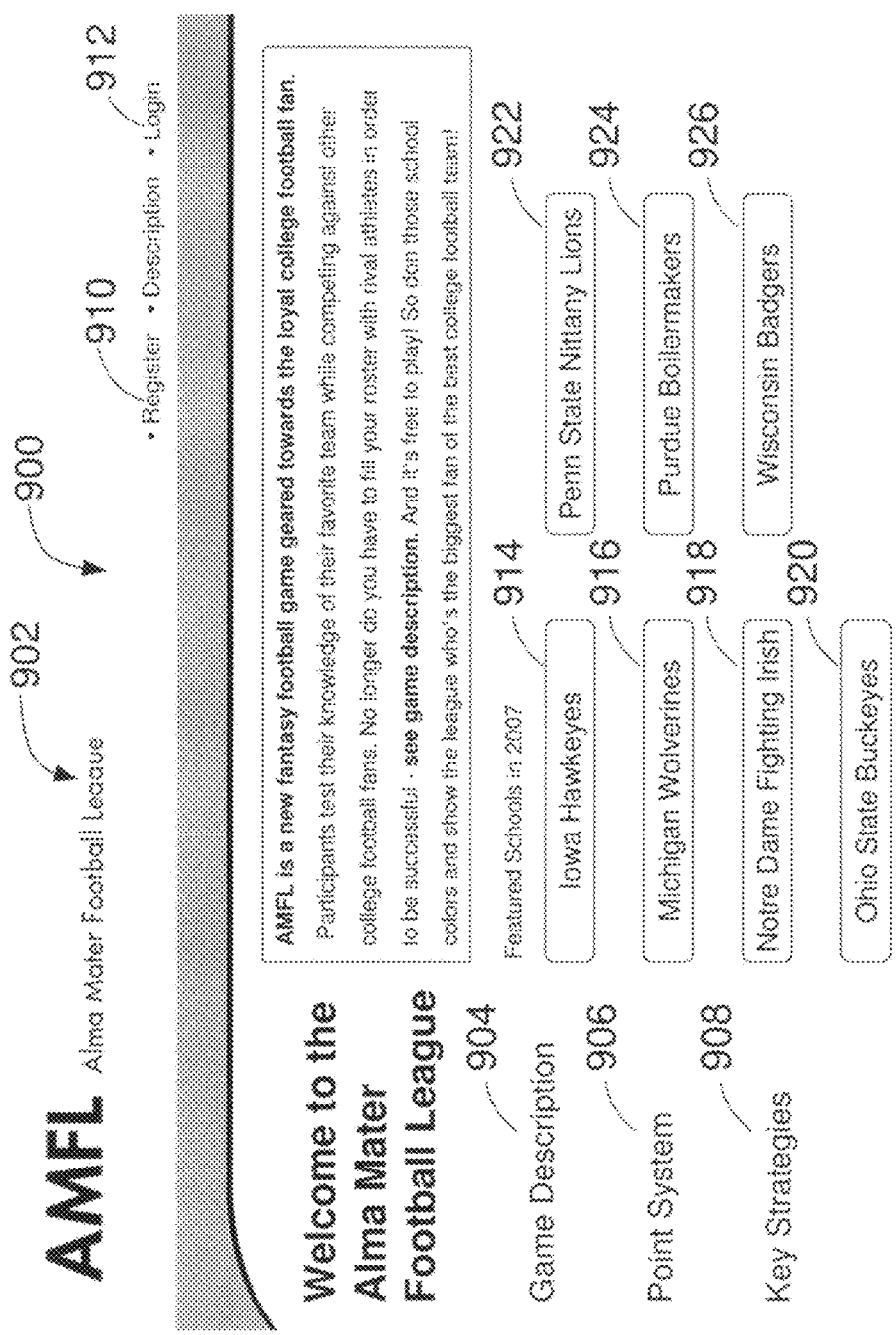
FIG. 9 is an illustration of an exemplary embodiment of a welcome page for a fantasy sport contest website in accordance with embodiments of the present disclosure.

FIG. 9 illustrates a presentation page 900 in accordance with embodiments of the present disclosure that may be used to implement a presentation page of a web site hosted by the host server 108 for purposes of conducting fantasy sport contests in accordance with the present disclosure. More particularly, the presentation page 900 may include a banner identifier 902 for clearly and emphatically identifying a web site that participants and/or potential participants may visit for purposes of learning about and/or participating in fantasy sport contests. The presentation page 00 may further include buttons corresponding to links to different types of content and/or forms to allowing a visitor to navigate through the site and/or become familiar with its form and function. For example, the presentation page 900 may include a button 04 linked to a portion of the web site providing a game description, a button 906 linked to a portion of the web site providing information about a points system, a button 908 linked to a portion of the web site providing information about beneficial strategies for participating in the types of fantasy sport contests provided via the web site, a button 910 linked to a portion of the web site permitting visitors to register as a participant or to receive further information, a button 912 linked to a portion of the web site allowing registered participants to log into the web site, and buttons 914, 916, 918, 920, 922, 924, and 926 linked to respective portions of the web site corresponding to various real life sports teams that may be featured by the web site and/or that may be included in fantasy sport contests provided via the web site. Other features and functions may be included.

Figure 10:
FIG. 10 is an illustration of an exemplary embodiment of another page for a fantasy sport contest website in accordance with embodiments of the present disclosure.

FIG. 10 illustrates a web page 1000 in accordance with embodiments of the present disclosure that may provide information about rules and/or instructions by which contests in accordance with the present disclosure may be participated in and/or administered. For example, the web page 1000, which may be associated with the web site of the presentation page 900 described above and/or the linking button 904 provided therein, may include a passage 1002 of informative text setting forth such rules and/or instructions. Other and/or different rules may apply to different contests in accordance with the present disclosure.

FIG. 11 illustrates a web page 1100 in accordance with embodiments of the present disclosure that may provide information about strategies by which participants engaging in contests in accordance with the present disclosure may increase their chances of winning. For example, the web page 1100, which may be associated with the web site of the presentation page 800 described above and/or the linking button 808 provided therein, may include a passage 1102 of informative text setting forth such strategies. Other and/or different strategies may apply to different contests in accordance with the present disclosure.

As used herein, the term 'contest' includes games or contests of a duration as short as one game, or as long as two or more games, including, for example, as long as a regular season of a collegiate football team, and/or an entire season of a collegiate football team including any and all post-season bowl games such collegiate football team may play. Furthermore, the term 'contest' applies both to games or contests in which point totals are determined by which to rank participants, and such point totals are either tracked cumulatively so as to indicate a potentially changeable ranking of participants based solely on total points accumulated, or in which points obtained by the participants from the field-of-play performance of the athletes populating their respective fantasy rosters are determined and the highest point total is used to determine either a 'win', a 'loss' or 'tie' (head to head) as between two participants, as between three or more participants.

Numerous modifications and variations of the embodiments of the present disclosure shown and described hereinabove are possible. The foregoing embodiments may be modified Various terms have been defined above. To the extent a term used in a claim is not defined above, it should be given the broadest definition persons in the pertinent art have given that term as reflected in at least one printed publication or issued patent. Furthermore, all patents and other documents cited in the application are fully incorporated by reference to the extent such disclosure is not inconsistent with this application and for all jurisdictions in which such incorporation is permitted.

The fact that any illustrative list is present in this disclosure does not intend a limitation of the present invention to those items listed. It is therefore desired that the invention not be limited to those embodiments.

While the foregoing description directed to subject matter considered at present to be illustrative, exemplary embodiments of the present invention, it will be recognized by those of ordinary skill in the art that many modifications, enhancements, alternatives, variations and/or changes can be achieved without departing from the spirit and scope of the invention. Therefore, it is manifestly intended that the invention be limited only by the scope of the claims and equivalents thereof.

What is claimed is:

1. A method of providing a fantasy sport contest comprising:
   causing a computer to permit a plurality of participants to populate respective fantasy rosters with actual athletes for purposes of competing with each other based on corresponding real-life field-of-play performances of the actual athletes populating the respective fantasy rosters;
   causing a computer to restrict a population of a first fantasy roster for a first participant to actual athletes who are teammates on a first real-life team;
   measuring a corresponding real-life field of play performance of the actual athletes on the first fantasy roster;
   causing a computer to restrict a population of a second fantasy roster for a second participant to actual athletes who are teammates on a second real-life team;
   measuring a corresponding real-life field-of-play performance of the actual athletes on the second fantasy roster;
   causing a computer to establish a ranking as between the first participant and the second participant based on the respective performance measurements; and
   causing a computer to display the ranking;
   wherein with respect to each of the first real-life team and the second real-life team, the contest spans a series of real-life games, and further includes causing a computer to require each of the first and second participants to change the respective first and second rosters at least once over the course of the series of real-life games by limiting an eligibility of at least one of such actual athletes to populate the respective first and second rosters to at least one less real-life game than all of the real-life games of the respective series.

2. A method of providing a fantasy sport contest in accordance with claim 1, wherein the first real-life team and the second real-life team are the same real-life team.

3. A method of providing a fantasy sport contest in accordance with claim 1, wherein the first real-life team and the second real-life team are different real-life teams.

4. A method of providing a fantasy sport contest in accordance with claim 3, wherein the performance measurements are from a game involving the first and second real-life teams playing each other.

5. A method of providing a fantasy sport contest in accordance with claim 3, wherein the performance measurements are from different respective games respectively involving the first and second real-life-teams playing respectively different teams.

6. A method of providing a fantasy sport contest in accordance with claim 1, further including making multiple such measurements in pairs over time with respect to the actual athletes of the first and second rosters in a head-to-head competition arrangement, and wherein establishing a ranking includes declaring a winner and a loser or declaring a tie with respect to each such pair of measurements made, and wherein displaying the ranking includes displaying a cumulative accounting of such wins, losses, and ties.

7. A method of providing a fantasy sport contest in accordance with claim 1, wherein establishing a ranking includes comparing a size of the measurement associated with the first fantasy roster with a size of the measurement associated with the second fantasy roster, and determining a ranking order for the first and second participants according to the measurement size comparison.

8. A method of providing a fantasy sport contest in accordance with claim 1, wherein each of the first real-life team and the second real-life team is a college football team, and each of the performance measurements is from a postseason bowl game for the respective college football team.

9. A method of providing a fantasy sport contest in accordance with claim 1, further comprising permitting each of the first and the second participants to designate at least one actual athlete populating the respective first and second roster as a star player, and wherein establishing a ranking includes bias, such that respective real-life field-of-play performances associated with an actual athlete designated as a star player is caused to have a proportionately greater degree of influence on a ranking outcome as compared to a respective real-life field-of-play performance of similar quality but associated with an actual athlete that is not so designated.

10. A method of providing a fantasy sport contest in accordance with claim 1, wherein establishing a ranking includes subjecting respective results of the measurements to a weighting system adapted to equalize field-of-play performance comparisons as across different positions played by the actual athletes.

11. A method of providing a fantasy sport contest in accordance with claim 10, wherein subjecting respective results of the measurement to a weighting system includes at least one selected from a group comprising applying one or more measurement multipliers, applying one or more bonuses, and applying a combination thereof.

12. A method of providing a fantasy sport contest in accordance with claim 1, wherein each of the first and second real-life teams is one selected from a group comprising a football team, a soccer team, a baseball team, a basketball team, and a hockey team.

13. A method of providing a fantasy sport contest in accordance with claim 1, wherein each of the first and second real-life team is a football team, and further comprising requiring each of the first and second contest participants, in populating the respective first and second rosters, to include a plurality of actual athletes playing respective positions on an offensive squad of the football team, and a plurality of actual athletes playing respective positions on a defensive squad of the football team.

14. A method of providing a fantasy sport contest in accordance with claim 13, further comprising requiring each of the first and second contest participants, in populating the respective first and second rosters, to include at least one actual athlete playing a respective position on a special teams squad of the football team.

15. A method of providing a fantasy sport contest in accordance with claim 13, wherein the plurality of actual athletes playing respective positions on an offensive squad of the football team include actual athletes playing one selected from a group comprising quarterback, running back, fullback, tailback, split end, tight end, wide receiver, offensive lineman, and kicker, and the plurality of actual athletes playing respective positions on a defensive squad of the football team include actual athletes playing one selected from a group comprising safety, cornerback, linebacker, defensive tackle, defensive end, and punter.

16. A system, comprising:
   at least one storage volume configured to receive, store, and permit retrieval with respect to content relating to a fantasy sport contest, the content being selected from a group comprising participant information, real-life team information, participant rankings, and a combination thereof; and
   a host server for interacting with the at least one storage volume for storing and retrieving the content relating to a fantasy sport contests, the host server being configured to apply rules wherein a plurality of participants are permitted to populate respective fantasy rosters with actual athletes for purposes of competing with each other based on corresponding real-life field-of-play performances of the actual athletes populating the respective fantasy rosters, restrict a population of a first fantasy roster for a first participant to actual athletes who are teammates on a first real-life team, restrict a population of a second fantasy roster for a second participant to actual athletes who are teammates on a second real-life team, establish a ranking as between the first participant and the second participant based on real-life field-of-play performances of the actual athletes populating the respective fantasy rosters, and display the ranking;
   wherein with respect to each of the first real-life team and the second real-life team, the contest spans a series of real-life games, and the host server is further configured to require each of the first and second participants to change the respective first and second rosters at least once over the course of the respective series of real-life games by limiting an eligibility of at least one of such actual athletes to populate the respective first and second rosters to at least one less real-life game than all of the real-life games of the respective series.

17. The system of claim 16, wherein the first and second real-life teams are the same real-life team.

18. The system of claim 16, wherein the first and second real-life teams are different real-life teams.

19. A non-transitory computer-readable medium comprising a program that, when executed by a processor, performs a method for providing a fantasy sport contest, the method comprising:
   permitting plurality of participants to populate respective fantasy rosters with actual athletes for purposes of competing with each other based on corresponding real-life field-of-play performances of the actual athletes populating the respective fantasy rosters;

restricting a population of a first fantasy roster for a first participant to actual athletes who are teammates on a first real-life team;

restricting a population of a second fantasy roster for a second participant to actual athletes who are teammates on a second real-life team;

establishing a ranking as between the first participant and the second participant based on real-life field-of-play performances of the actual athletes populating the respective fantasy rosters; and displaying the ranking;

wherein with respect to each of the first real life team and the second real-life team, the contest spans a series of real-life games, and the method further includes requiring each of the first and second participants to change the respective first and second rosters at least once over the course of the respective series of real-life games by limiting an eligibility of at least one of such actual athletes to populate the respective first and second rosters to at least one less real-life game than all of the real-life games of the respective series.

20. A method of providing a fantasy sport contest in accordance with claim 1, wherein for at least one of the first real-life team and the second real-life team, the series of real-life games includes each real-life game of an entire regular season of real-life games of the one of the first real-life team and the second real-life team.

* * * * *